US011915326B2

(12) United States Patent
Poole et al.

(10) Patent No.: US 11,915,326 B2
(45) Date of Patent: Feb. 27, 2024

(54) DETERMINING TAG RELEVANCE

(71) Applicant: International Business Machines Corporation, Armonk, NY (US)

(72) Inventors: Christopher John Poole, Romsey (GB); Joseph Peter Kent, Stockbridge (GB); Thomas James Waterton, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 17/508,137

(22) Filed: Oct. 22, 2021

(65) Prior Publication Data

US 2023/0131470 A1 Apr. 27, 2023

(51) Int. Cl.
*G06Q 50/00* (2012.01)

(52) U.S. Cl.
CPC .................................... *G06Q 50/01* (2013.01)

(58) Field of Classification Search
CPC ...................................................... G06Q 50/01
See application file for complete search history.

(56) References Cited

U.S. PATENT DOCUMENTS 10,268,780 B2 4/2019 Albouyeh
10,871,877 B1 * 12/2020 Clediere ................ G06Q 50/01
2011/0137845 A1 6/2011 Ward
2012/0265806 A1 * 10/2012 Blanchflower ......... H04L 51/52 709/204
2013/0080453 A1 3/2013 Motgi
2013/0346877 A1 * 12/2013 Borovoy ............... H04L 65/403 715/753
2016/0034537 A1 2/2016 Chakra
2016/0328401 A1 11/2016 Dhawan
2017/0177589 A1 * 6/2017 Shorman ............... H04L 67/306
2017/0220556 A1 8/2017 Pasternack
2018/0032961 A1 * 2/2018 Shreibati ................ G06Q 50/01
2018/0089319 A1 3/2018 Boudreau
2019/0005021 A1 * 1/2019 Miller ...................... G10L 15/26
2019/0327331 A1 * 10/2019 Natarajan ........... G06F 16/3344
2020/0034893 A1 * 1/2020 Anders ................. G06F 16/907

(Continued)

FOREIGN PATENT DOCUMENTS

WO WO-2009059297 A1 * 5/2009 ....... G06F 17/30613

OTHER PUBLICATIONS

"Levenshein Distance", Wikipedia, This page was last edited on Mar. 9, 2021, 9 Pages, <https://en.wikipedia.org/wiki/Levenshtein_distance>.

(Continued)

*Primary Examiner* — Dennis W Ruhl
(74) *Attorney, Agent, or Firm* — Edward J. Wixted, III

(57) ABSTRACT

Embodiments of the present invention provide a concept for determining the relevance of a tag within a post. Responsive to receiving a post composed by a first user and containing a tag referring to a second user, a post context based on a topic of the post, a user context based on a record of the first user and a tag context based on a record of the second user are obtained. The post context and the user context are compared to the tag context, and it is determined whether the tag is relevant to the post and the first user based on comparing the post context and the user context to the tag context.

20 Claims, 7 Drawing Sheets

(56) References Cited

U.S. PATENT DOCUMENTS

2020/0183996 A1 6/2020 Deluca
2022/0329556 A1* 10/2022 Daga ........................ H04L 51/23

OTHER PUBLICATIONS

"Search Tweets" Standard v1.1, Twitter Developer Platform, Retrieved on Sep. 14, 2021, pp. 1-8, ,https://developer.twitter.com/en/docs/tweets/search/api-reference/get-search-tweets>.
"Spelling Correction" TextRazor, The Natural Language Processing API, Retrieved from Internet Sep. 8, 2021, pp. 1-2, <https://www.textrazor.com/spelling>.
Cameron; "David Cameron Accidentally Tweets Fake Iain Duncan Smith Account", The Guardian, Jul. 2013, pp . 1-4, <https:www.theguardian.com/politics/2013/jul/15/Cameron-tweets-fake-I . . . >.
Elmi et al., "Spelling Correction Using Context", Department of Computer Science, Illinois Institute of Technology, Retrieved from Internet Sep. 8, 2021, p. 1-5, <csevens@minna.iit.edu>.
Mell et al., "The NIST Definition of Cloud Computing", National Institute of Standards and Technology, Special Publication 800-145, Sep. 2011, 7 pages.
Standard search API/Docs/Twitter Developer, Retrieved on Sep. 8, 2021, pp. 1-20, <https://developer.twitter.com/en/docs/twitter-ap . . . >.
The Telegraph News, "Donald Trump accidentally tweets the wrong Theresa May in latest Twitter outburst to strain UK ties", Retrieved on Sep. 8, 2021, pp. 1-6, <https://www.telegraph.co.uk/news/2017/11/30 . . . >.

* cited by examiner

DETERMINING TAG RELEVANCE

BACKGROUND

The technical character of the present invention generally relates to the field of social media systems and platforms, and more particularly, systems and methods for checking user posts on social media systems and platforms.

Social media platforms often allow users to tag other users in a post by adding the other users' user account or user handle, either as a direct reply to the post or as a mention in the post. The term tag refers to a function for linking a user account with a user's post, typically by including the user account, or handle, in the post, often in combination with a special character to denote that the handle is intended as a tag. For example, the format '@Joe' may tag the user with that handle into a post. So, the user with the '@Joe' handle will be able to see all posts that are either a direct reply to them or in which they are mentioned.

While some social media platforms allow users to search for a specific user account, these platforms do not perform any checking when a post is being composed to make sure that the tagged user accounts, or handles, being added are the correct ones intended by the user writing the post. Due to the number of users on social media platforms, almost any given user account, or handle, is likely to be somewhat similar to other user accounts. This can be problematic and can lead to users inadvertently tagging the wrong user account, or handle, and thus notifying the wrong person to the post or reply.

This is particularly problematic when an incorrect user is tagged in a popular post, in which case the incorrectly tagged user can potentially receive a vast number of notifications that are irrelevant to them.

SUMMARY

The present invention seeks to provide a method for determining the relevance of a tag within a post. Such methods may be computer-implemented. That is, such methods may be implemented in a computer infrastructure having computer executable code tangibly embodied on a computer readable storage medium having programming instructions configured to perform a proposed method. The present invention further seeks to provide a computer program product including computer program code for implementing the proposed concepts when executed on a processor. The present invention yet further seeks to provide a system for determining the relevance of a tag within a post.

According to an aspect of the present invention there is provided a computer-implemented method for determining the relevance of a tag within a post. The method comprises, responsive to receiving a post composed by a first user and containing a tag referring to a second user, obtaining a post context based on a topic of the post, a user context based on a record of the first user and a tag context based on a record of the second user and comparing the post context and the user context to the tag context. It is then determined whether the tag is relevant to the post and the first user based on the comparison.

Embodiments may be employed in combination with conventional/existing social media systems or platforms. In this way, embodiments may integrate into legacy systems so as to improve and/or extend their functionality and capabilities. An improved social media system or platform may therefore be provided by proposed embodiments.

According to another embodiment of the present invention, there is provided a computer program product for determining the relevance of a tag within a post, the computer program product comprising a computer readable storage medium having program instructions embodied therewith, the program instructions executable by a processing unit to cause the processing unit to perform a method comprising: responsive to receiving a post composed by a first user and containing a tag referring to a second user: obtaining a post context based on a topic of the post, a user context based on a record of the first user and a tag context based on a record of the second user; comparing the post context and the user context to the tag context; and determining whether the tag is relevant to the post and the first user based on the comparison.

According to yet another aspect, there is provided a processing system comprising at least one processor and the computer program product according to one or more embodiments, wherein the at least one processor is adapted to execute the computer program code of said computer program product.

According to another aspect, there is provided a system for determining the relevance of a tag within a post, the system comprising: a processor arrangement configured to perform, responsive to receiving a post composed by a first user and containing a tag referring to a second user, the steps of: obtaining a post context based on a topic of the post, a user context based on a record of the first user and a tag context based on a record of the second user; comparing the post context and the user context to the tag context; and determining whether the tag is relevant to the post and the first user based on the comparison.

Thus, there may be proposed concepts for determining whether a tag included in a post is relevant to said post. The determination of whether the tag is relevant to the post may then be used to inform the user that a potentially incorrect tag has been included in a post. Providing such tag relevance checking may help to prevent a user from erroneously including an irrelevant tag, which may be incorrectly referring to another user, in their post.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
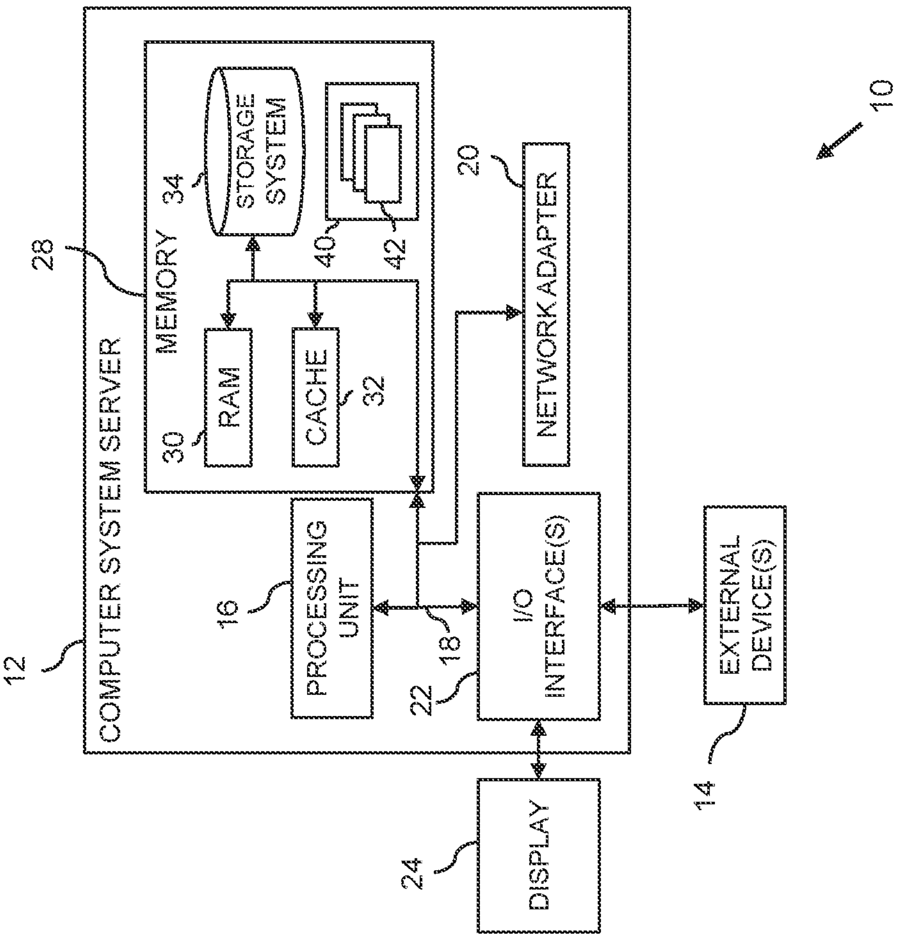
FIG. 1 depicts a cloud computing node according to an embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

In the present application, the term "user" should be understood as any entity that holds an account on a social media platform and can include natural persons, corporate entities and the like. Further, in the present application, the term "post" should be understood as any content generated by a user to be uploaded to the social media platform and can include text, photographs, videos, audio files and the like.

In the present application, the term "context", for example when used as "post context", "user context" or "tag context", should be understood as a quantifiable aspect of the post, user or tag, such as a metric, a topic and the like.

The technical character of the present invention generally relates to methods for checking social media posts, and more particularly, to checking the relevance of a tag within a social media post, for example, based on the user writing the post and the context of the post. More specifically, embodiments of the present invention provide a concept for determining the relevance of a tag within a post. The method comprises, responsive to receiving a post composed by a first user and containing a tag referring to a second user, obtaining a post context based on a topic of the post, a user context based on a record of the first user and a tag context based on a record of the second user; comparing the post context and the user context to the tag context; and determining whether the tag is relevant to the post and the first user based on the comparison.

The invention provides a means of determining whether a tag included in a post is relevant to said post. In this way, it may be possible to prevent the first user from erroneously including an irrelevant tag, which may be referring to an incorrect second user, in their post.

In other words, there is provided a concept of determining whether the context of a tag and the context of a post do or do not match each other based on the content of the post and the known information associated with the tag.

It has been recognized that, due to the large number of users on social media platforms, frequently two different users will have similar user handles, or tags, meaning that it is becoming increasingly likely that the incorrect user will be tagged in a post. Accordingly, the method provides a means of determining whether the incorrect user is potentially being tagged in the post. Thus, the incorrect tagging of a user may be prevented, thereby reducing the number of irrelevant notifications the potentially incorrectly tagged user receives.

Put another way, there are provided concepts for improving a social media platform to automatically determine whether the user being tagged in a draft post is the correct user originally intended to be tagged by the user composing the post. Thus, the number of erroneous tags attached to posts on the social media platform may be reduced and the user experience may be improved.

In an embodiment, the method further comprises determining a post context of the post based on a topic of the post. In this way, the topics discussed within the post may be used to determine the context of the post.

In a further embodiment, determining the post context of the post comprises: extracting a topic from the post; analyzing the extracted topic; and determining the post context based on a result of the analysis of the extracted topic. In this way, the context of the post may be determined individually for each post based on the topics included in the post.

In an embodiment, wherein the post comprises a plurality of topics, and wherein determining the post context of the post comprises: extracting the plurality of topics from the post; analyzing each of the extracted topics; and determining one or more post contexts based on a result of the analysis of the extracted topics. In this way, a post containing multiple topics may also be determined to have more than one context depending on the nature of the included topics.

In a further embodiment, the method further comprises: for each determined post context, determining a proportion of the post relating to the determined post context; ranking the determined one or more post contexts based on the determined proportions of the post relating to each determined post context; and wherein determining whether the tag is relevant to the post and the first user is further based on the ranked one or more post contexts. In this way, it may be possible to identify that a given context is more important to the post that another context, which may then be taken into account when comparing the one or more post contexts to the tag context.

In an embodiment, the method further comprises determining a user context of the first user based on a record of the first user. In a further embodiment, determining the user context of the first user comprises: extracting a first user topic from the record of the first user; analyzing the extracted first user topic; and determining the user context based on a result of the analysis of the extracted first user topic.

In a further embodiment, wherein the record of the first user comprises a plurality of first user topics, and wherein determining the user context of the first comprises: extracting the plurality of first user topics from the record of the first user; analyzing each of the extracted first user topics; and determining one or more user contexts based on a result of the analysis of the extracted first user topics.

In an embodiment, wherein the method further comprises determining a tag context of the tag based on a record of the second user. In a further embodiment, determining the tag context of the tag comprises: extracting a user topic from the record of the second user; analyzing the extracted user topic; and determining the tag context based on a result of the analysis of the extracted user topic.

In a further embodiment, wherein the record of the second user comprises a plurality of user topics, and wherein determining the post context of the post comprises: extracting the plurality of user topics from the record of the second user; analyzing each of the extracted user topics; and determining one or more tag contexts based on a result of the analysis of the extracted user topics.

In an embodiment, determining whether the tag is relevant to the post comprises: determining an overlap between the tag context and the post context and the user context based on the comparison; and determining the relevance of the tag to the post based on the determined overlap.

In an embodiment, wherein the post comprises a plurality of topics and the record of the second user comprises a plurality of user topics, and wherein one or more post contexts are determined based on the plurality of topics and one or more tag contexts are determined based on the plurality of user topics, and wherein determining whether the tag is relevant to the post comprises: determining an overlap between the one or more tag contexts, the one or more post contexts, and the one or more user contexts based on the comparison; and determining the relevance of the tag to the post based on the determined overlap. In this way, contexts that are determined to overlap in a significant manner may be determined to be relevant to each other; whereas contexts that do not overlap in a meaningful way may be determined to not be relevant to each other.

In an embodiment, determining whether the tag is relevant to the post comprises: identifying an ignored topic of the first user, wherein the ignored topic is a topic that the first user has specified as not relevant; comparing the ignored topic to the tag context; and determining the relevance of the tag to the post based on the comparison.

In an embodiment, responsive to determining that the tag is not relevant to the post and the first user, the method further comprises generating an alert to be provided to the first user. In this way, when providing the post, the first user may be alerted that the tag may not be relevant to the post.

In an embodiment, responsive to determining that the tag is not relevant to the post and the first user, the method further comprises: searching a user database for a relevant tag based on the post context and the user context; replacing the tag with the relevant tag; and posting the post. In this way, an irrelevant tag may be automatically replaced by a more relevant tag on the user's behalf.

In an embodiment, the record of the first user and the record of the second user comprise one or more of: a user biography; a previous post; an interaction with a different post composed by another user, i.e., a third user or a fourth user; an interaction with another user, i.e., a third user or a fourth user; a selected topic of interest; a number of posts made by the user; an activity of the user; and an amount of time elapsed since a most recent activity of the user.

Embodiments of the present invention further provide a computer program product for determining the relevance of a tag within a post, the computer program product comprising a computer readable storage medium having program instructions embodied therewith, the program instructions executable by a processing unit to cause the processing unit to perform a method comprising: responsive to receiving a post composed by a first user and containing a tag referring to a second user: obtaining a post context based on a topic of the post, a user context based on a record of the first user and a tag context based on a record of the second user; comparing the post context and the user context to the tag context; and determining whether the tag is relevant to the post and the first user based on the comparison.

Embodiments of the present invention further provide a processing system comprising at least one processor and the computer program product described above, wherein the at least one processor is adapted to execute the computer program code of said computer program product.

Embodiments of the present invention further provide a system for determining the relevance of a tag within a post, the system comprising: a processor arrangement configured to perform, responsive to receiving a post composed by a first user and containing a tag referring to a second user, the steps of: obtaining a post context based on a topic of the post, a user context based on a record of the first user and a tag context based on a record of the second user; comparing the post context and the user context to the tag context; and determining whether the tag is relevant to the post and the first user based on the comparison.

It is understood in advance that although this disclosure includes a detailed description on cloud computing, implementation of the techniques recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client can be implemented as one or more of the program modules 42. Additionally, the DHCP client may be implemented as separate dedicated processors or a single or several processors to provide the functionality described herein. In embodiments, the DHCP client performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
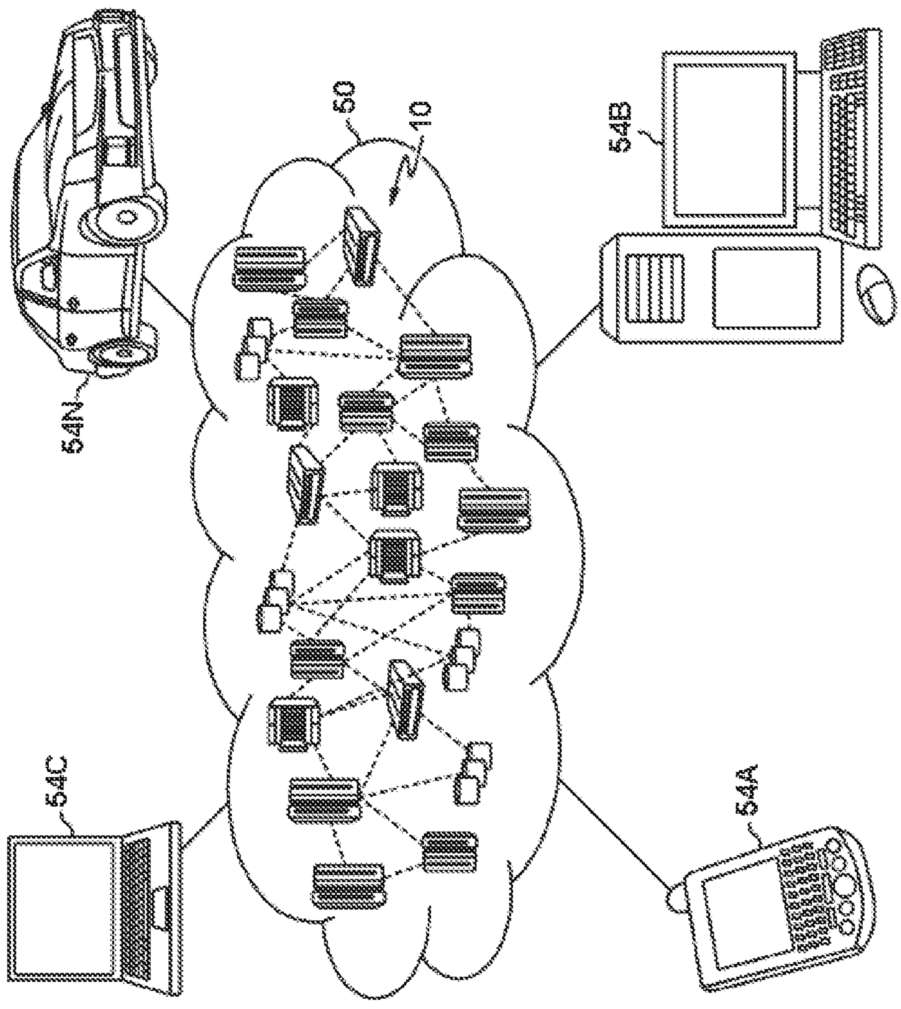
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
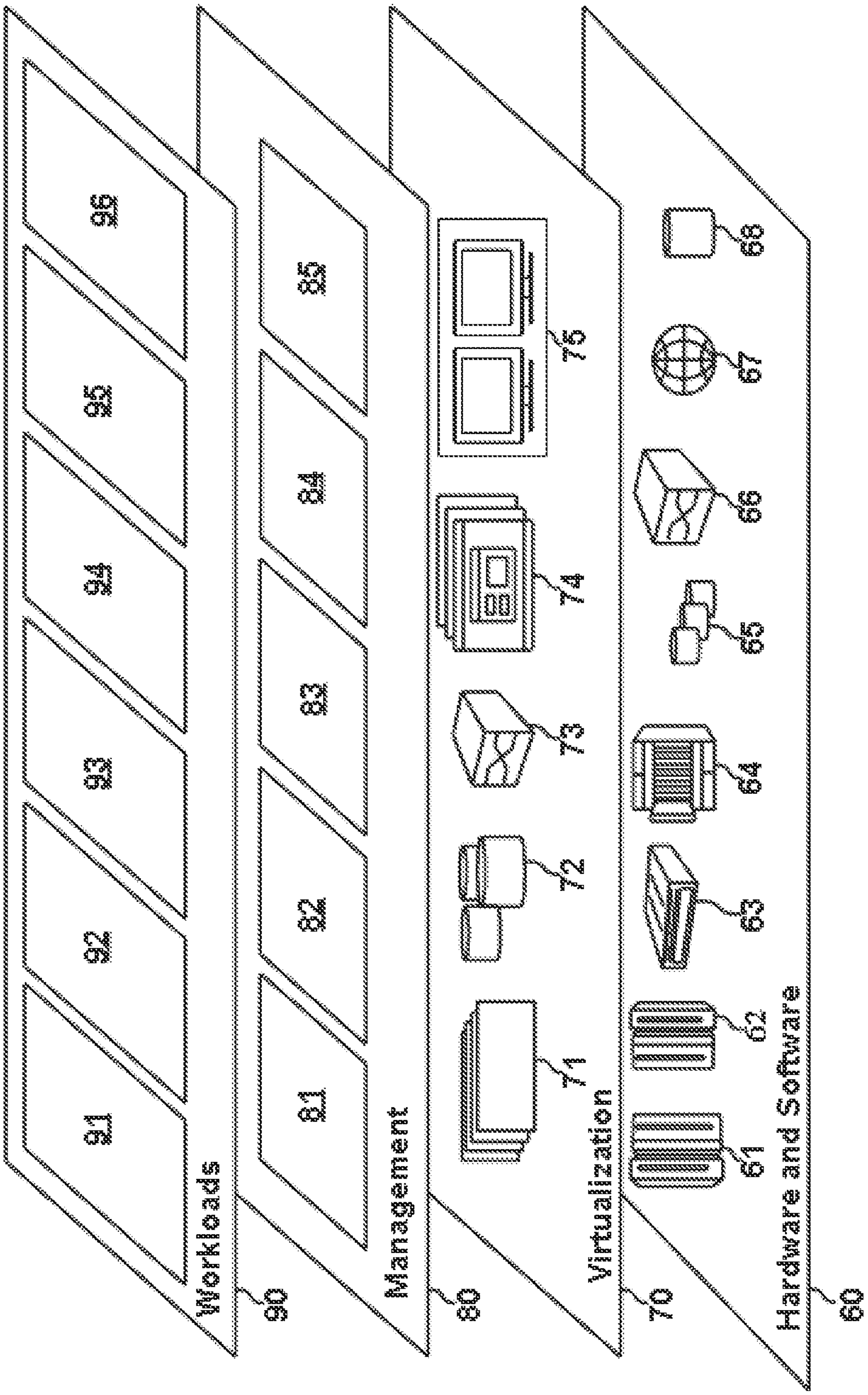
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tag checking processes 96 described herein. In accordance with aspects of the invention, the tag checking processes 96 workload/function operates to perform one or more of the processes described herein.

Figure 4:
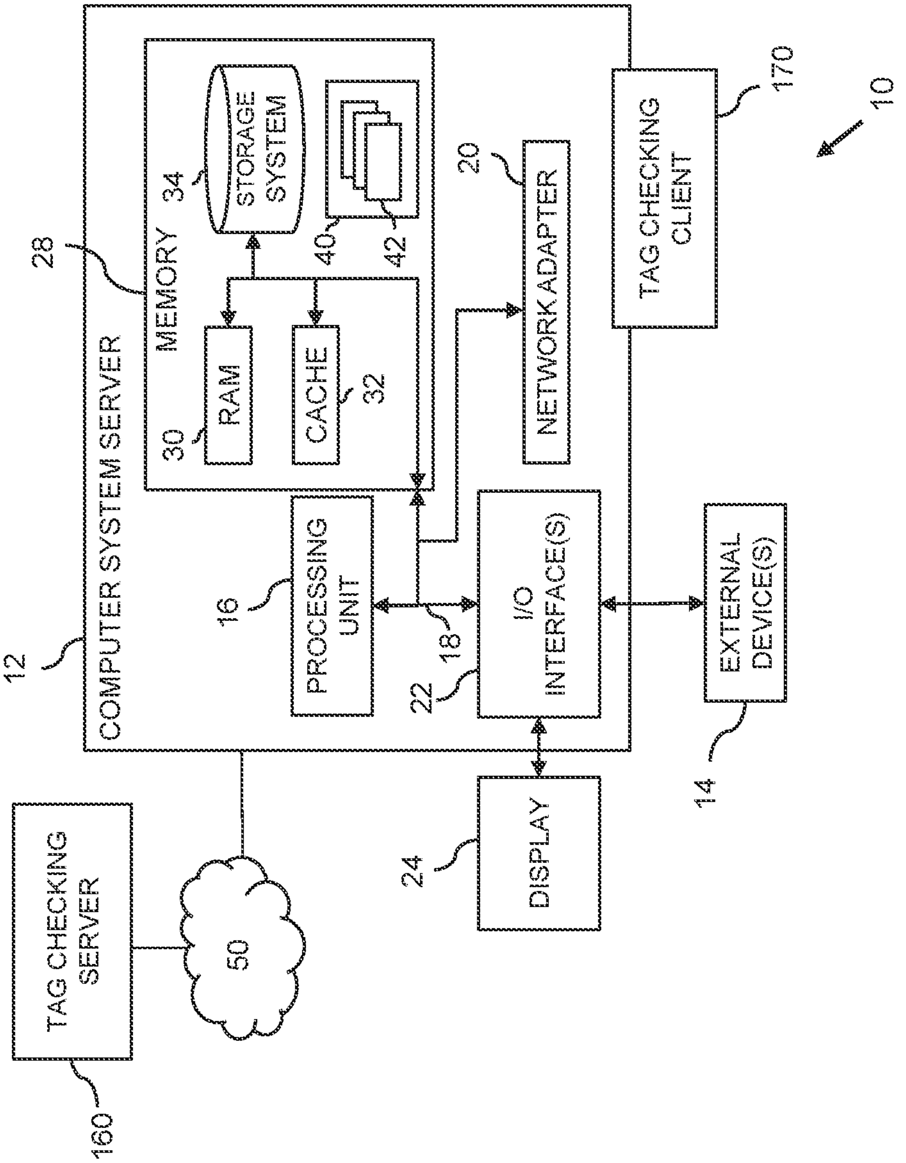
FIG. 4 depicts a cloud computing node according to another embodiment of the present invention.

FIG. 4 depicts a cloud computing node according to another embodiment of the present invention. In particular, FIG. 4 is another cloud computing node which comprises a same cloud computing node 10 as FIG. 1. In FIG. 4, the computer system/server 12 also comprises or communicates with a tag checking client 170, and a tag checking server 160.

In accordance with aspects of the invention, the tag checking client 170 can be implemented as one or more program code in program modules 42 stored in memory as separate or combined modules. Additionally, the tag checking client 170 may be implemented as separate dedicated processors or a single or several processors to provide the function of these tools. While executing the computer program code, the processing unit 16 can read and/or write data to/from memory, storage system, and/or I/O interface 22. The program code executes the processes of the invention.

By way of example, tag checking client 170 may be configured to communicate with the tag checking server 160 via a cloud computing environment 50. As discussed with reference to FIG. 2, for example, cloud computing environment 50 may be the Internet, a local area network, a wide area network, and/or a wireless network. In embodiments of the proposed tag checking mechanism, the tag checking server 160 may provision data to the client 170. One of ordinary skill in the art would understand that the tag checking client 170 and tag checking server 160 may communicate directly. Alternatively, a relay agent may be used as an intermediary to relay messages between tag checking client 170 and tag checking server 160 via the cloud computing environment 50.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code composed in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Figure 5:
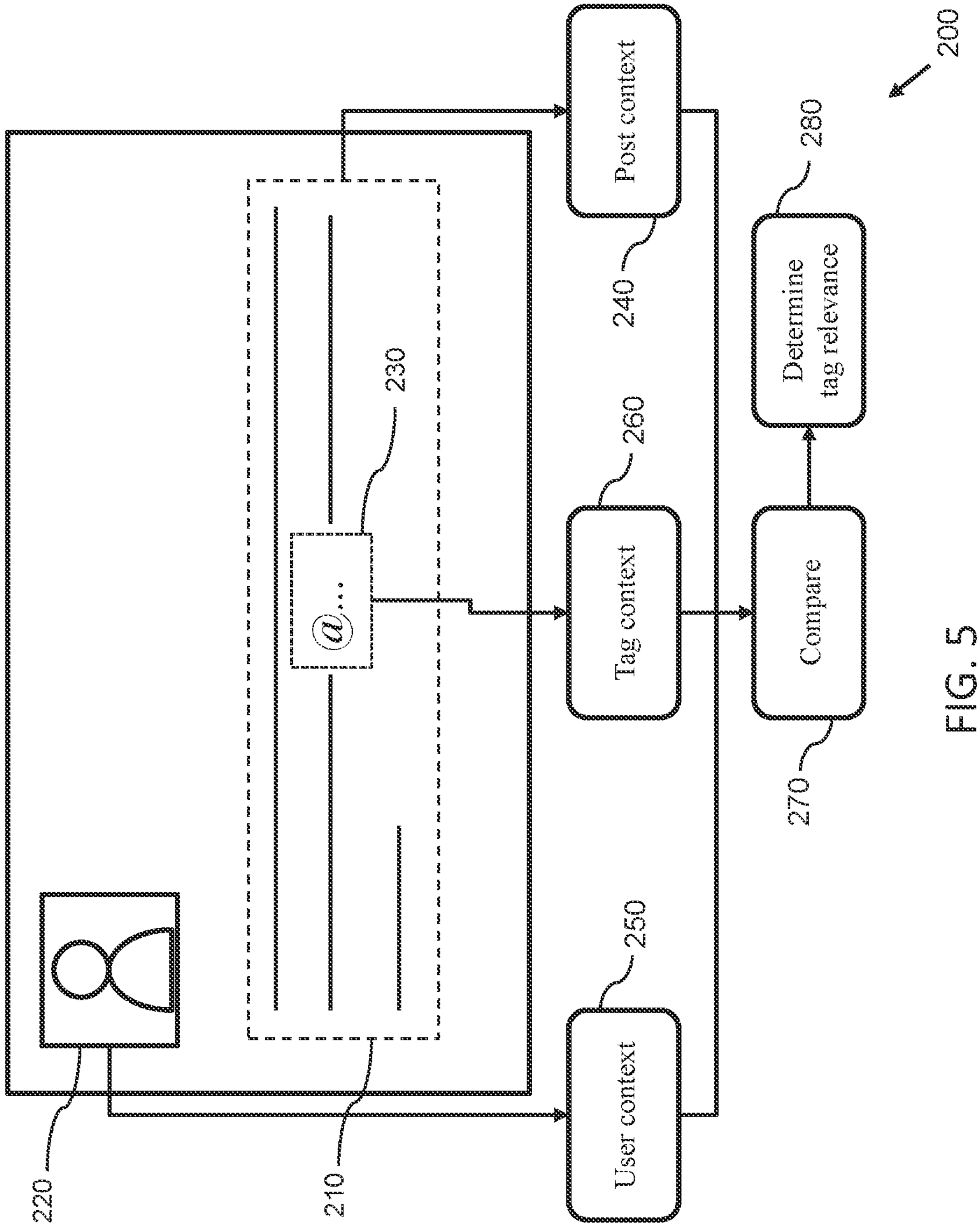
FIG. 5 depicts a simplified schematic representation of a method for determining the relevance of a tag within a post.

FIG. 5 depicts a simplified schematic representation of a method 200 for determining the relevance of a tag 230 within a post 210.

A post 210 composed by a first user 220 and containing a tag 230 referring to a second user is received at a social media platform. For example, the social media platform may comprise an input field for the first user to compose the post before it is posted on the social media platform. The methods described herein may be performed during the composition of the post by the first user.

A post context 240 is then obtained from the post based on a topic of the post. In addition, a user context 250 is obtained based on a record of the first user and a tag context 260 is obtained based on a record of the second user. The processes for obtaining the post context, the user context and the tag context are described in further detail below.

The method progresses to step 270, where the post context and the user context are compared to the tag context and in step 280 it is determined whether the tag is relevant to the post and the first user based on the comparison.

Put another way, the method provides a means of extracting the context of the post and comparing the post context, and the information known about the first user, to the information known about the tagged second user in order to determine whether the second user is relevant to the post.

The invention may provide an enhancement for social media platforms, which may provide users with a warning that a user account they have tagged in a post is possibly not the one they intended, for example based on topic identification and natural language parsing of the content of their written post.

Figure 6:
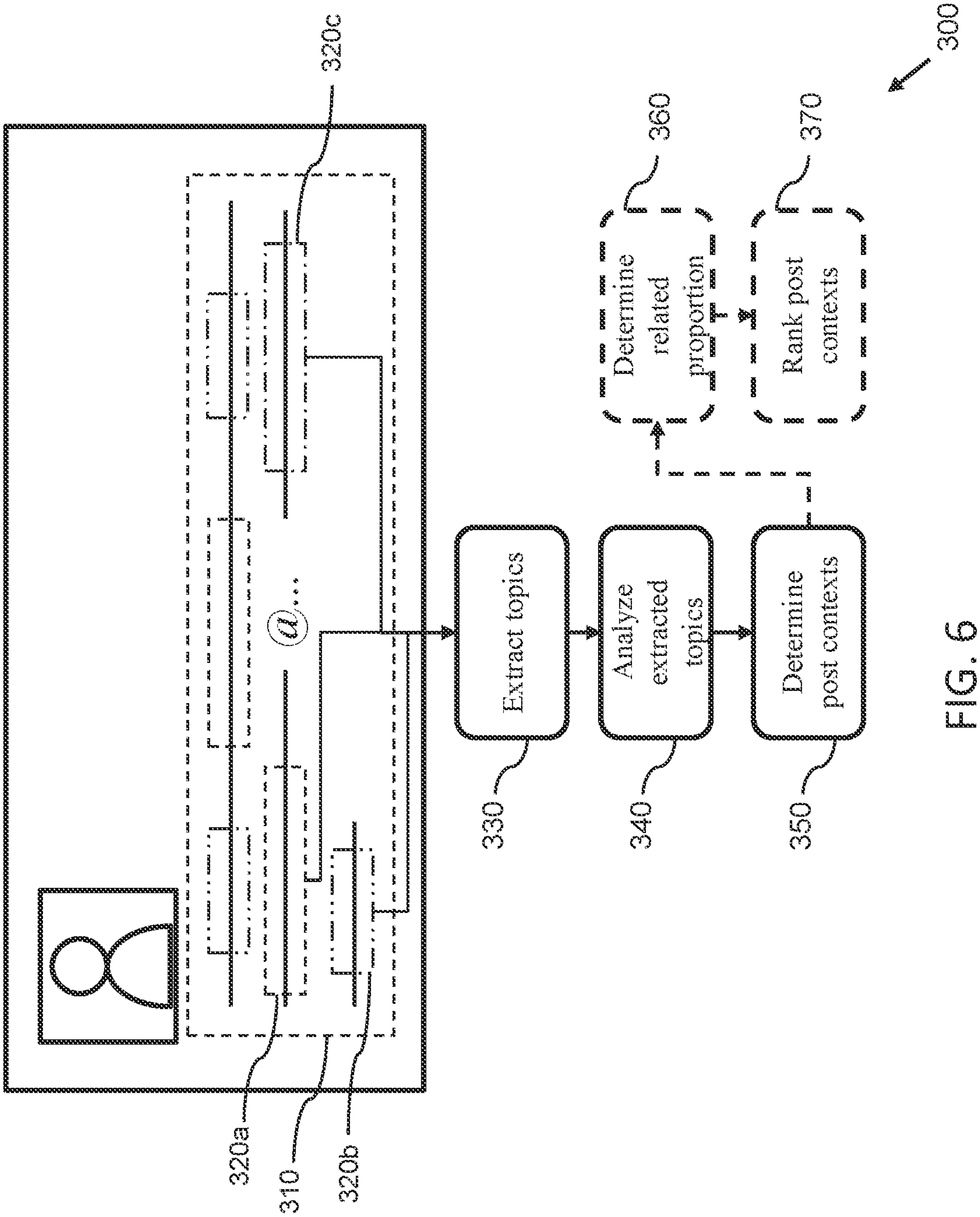
FIG. 6 depicts a simplified schematic representation of a method for determining a post context of a post based on a topic of the post.

FIG. 6 depicts a simplified schematic representation of a method 300 for determining a post context of the post 310 based on a topic of the post. In the example depicted in FIG. 6, the post comprises a plurality of different topics 320*a*, 320*b* and 320*c*; however, the method described below may apply to posts having one or more topics included therein.

In step 330, the plurality of topics are extracted from the post and in step 340, each of the extracted topics are analyzed. For example, the social media platforms may make use of known Natural Language Processing methods to parse data from the post and extract semantic topics from the post. In other words, when a user is drafting a post, natural language processing may be used to identify the main semantic topics covered in their draft post.

The one or more post contexts are then determined in step 350 based on a result of the analysis of the extracted topics. By way of example, the one or more post contexts may comprise any topic, such as: sports; cooking; entertainment; politics; religion; and the like.

In a further embodiment of the method, the method for determining the post context may further include the step 360 of determining, for each determined post context, a proportion of the post relating to the determined post context.

The determined one or more post contexts may then be ranked in step 370 based on the determined proportions of the post relating to each determined post context. In this case, determining whether the tag is relevant to the post and the first user may be further based on the ranked one or more post contexts. Put another way, the top given number of post contexts identified may be cross-checked with the topics associated with the user accounts of any tagged accounts mentioned in the draft post in order to determine the relevance of the tag to the post and the first user.

Figure 7:
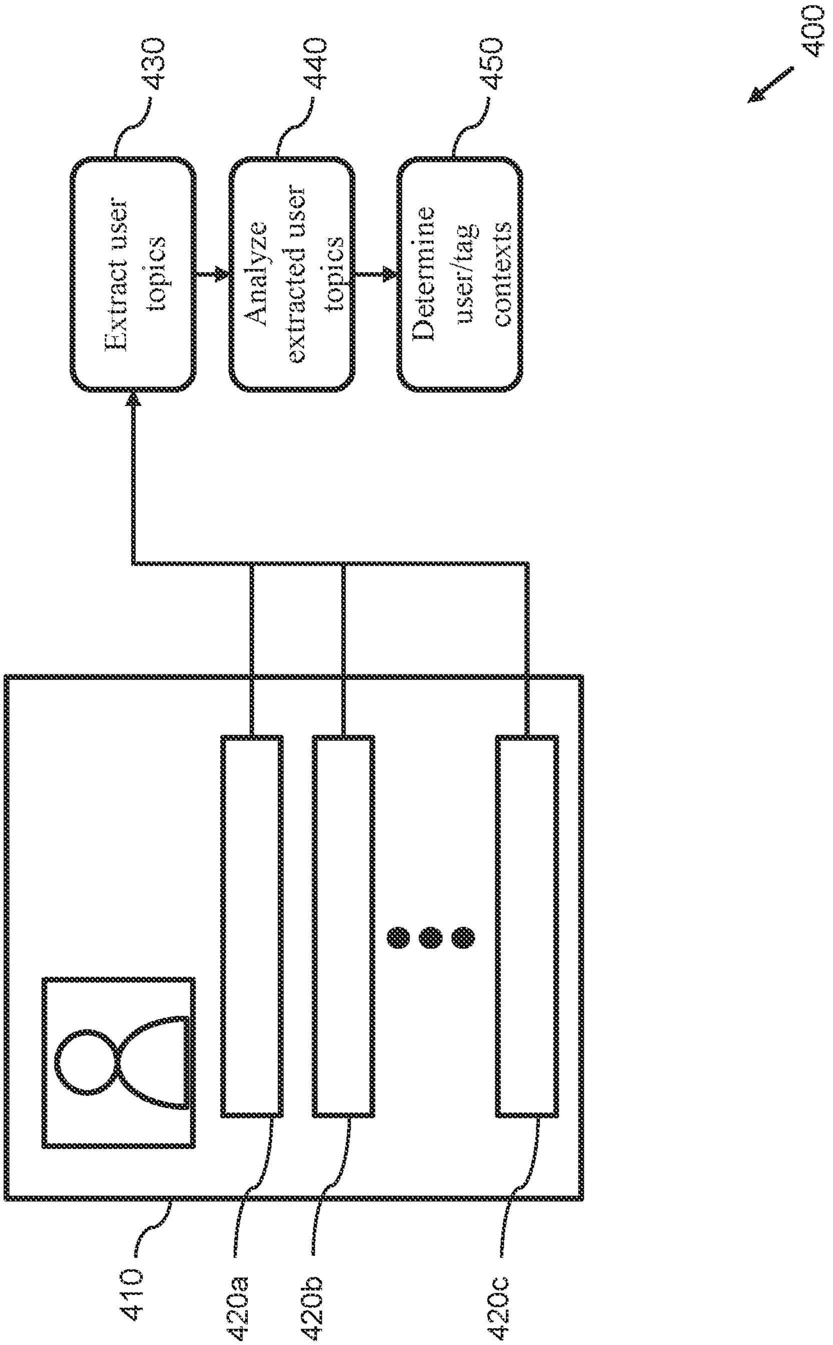
FIG. 7 depicts a simplified schematic representation of a method for determining a user context of the first user based on a record of the first user or a tag context of the tag based on a record of the second user.

FIG. 7 depicts a simplified schematic representation of a method 400 for determining a user context of the first user based on a record 410 of the first user or a tag context of the tag based on a record of the second user. It should be noted that the methods of determining the user context and the tag context are similar in nature and have been described here together; however, the user context and the tag context may be determined separately using different combinations of the methods described below.

Further, in the example depicted in FIG. 7, the user record comprises a plurality of different user topics 420*a*, 420*b* and 420*c*; however, the method described below may apply to posts having one or more topics included therein. For example, the record of the first user and the record of the second user may comprise one or more of: a user biography; a previous post; an interaction with a post composed by another user, i.e., a third user or a fourth user; an interaction with another user, i.e., a third user or a fourth user; a selected topic of interest; a number of posts made by the user; an activity of the user; and an amount of time elapsed since a most recent activity of the user.

Further, the user record may include an ignored topic of the user, wherein the ignored topic is a topic that the user has specified as not relevant to them. The ignored topic may be compared to the tag context and the relevance of the tag to the post may be determined based on the comparison. For example, a first user may define an ignored topic and the system may then prevent tags associated with that topic from being suggested to the user or generate an alert if the first user includes a tag associated with that topic in their post. In a further example, the second user may define an ignored topic and the system may then prevent first users from tagging the second user in posts associated with that topic or generate an alert if the first user includes the tag of the second user in a post associated with that topic.

Accordingly, the invention may provide a means of establishing and storing semantic user topic data about each user on the social media platform. The social media platform may achieve this by parsing the following sources of information: the user's social media biography text; the content of the user's previous posts, which may include all of their historic posts, a select number of recent posts or a select number of their highest impact posts (as defined by likes, comments, user interactions, etc.); content of other users' posts that the user has interacted with; and optionally, users may also explicitly add user topics that they are interested in to their social media account profiles.

In addition, the first user's previous activity may be taken into account, and more specifically, whether the first user has previously interacted with any of the accounts with similar names to the tagged user. For example, if two user accounts similar to the tag match the semantic topics extracted from the record of the first user, but one of the matching user accounts was followed, or had been interacted with, by the first user then that one would be ranked higher.

In step 430, the plurality of user topics are extracted from the record of the first user or the second user and each of the extracted user topics are analyzed in step 440. One or more user, or tag, contexts are then determined in step 450 based on a result of the analysis of the extracted user topics. By way of example the extracted user topics may be analyzed by way of a natural language processing method in order to identify semantic topics relating to the first and second users, which may then form the basis of the tag context and the user context.

Determining whether the tag is relevant to the post may be performed by determining an overlap between the tag context and the post context and the user context and determining the relevance of the tag to the post based on the determined overlap. For example, if the post context and user context have a large overlap with the tag context, the tag may be determined to have a high relevance to the post; whereas, if the post context and user context have little to no overlap with the tag context, the tag may be determined to have a low relevance to the post. In some cases, the tag context may have little to no overlap with the post context, but a large overlap with the user context. This may occur, for example, when two user accounts with a large number of interactions between them discuss a new topic for the first time. In this case, the tag may still be determined to be relevant to the post even though the post context and the tag context have little to no overlap.

As discussed above, a post can contain multiple topics, meaning that the post can have multiple post contexts. Similarly, the first user may possess multiple user contexts and the tag may possess multiple tag contexts. In this case, the level of overlap between each of the contexts may be assessed in order to determine the relevance of the tag to the post.

If the tag context meets a predefined threshold of overlap, for example a predefined percentage match of the relevant semantic topics, with the semantic topics identified in the draft post, i.e., the post context, and the user context then no further action may be taken by the social media platform and the post may be published as normal.

However, if the semantic topics identified in the draft post, i.e., the post context, and the list of semantic topics associated with any user accounts mentioned in the draft post, i.e., the one or more tag contexts, do not meet the predefined threshold of overlap, then the user may be alerted, for example by way of through a UI message, that a user account they have tagged in their draft post might not be the user account they intended to include based on the content of their post.

At this point, the method may include providing a suggestion to the first user for other user accounts that are a better match to the post context and the user context, which are therefore more likely to be the accounts the first user intended to tag in the post. This may be achieved by referencing a list of other user accounts that are within a given number of characters different from the potentially incorrect user account that the user tagged in their draft post and comparing the semantic topic matches of those other user accounts.

In other words, responsive to determining that the tag is not relevant to the post and the first user, an alert may be generated and provided to the first user. Further, the method may include searching a user database for a relevant tag based on the post context and the user context. The tag in the draft post may then be replaced with the relevant tag automatically or simply suggested to the user to manually effect the replacement.

Identifying a relevant tag may be performed using a Levenshtein distance string metric to establish the similarity/difference between two strings i.e., tags. The Levenshtein distance string metric may be determined on the fly, or it may be calculated for each individual user profile on the social media platform in advance and the results may be stored in a memory for each given user account and may also be refreshed every certain number of days.

By way of example, if the first user included the tag "@Star_Enterprise" in a draft post about web/digital marketing and SEO and that account had no matches to the semantic topics of 'web', 'marketing', 'digital', or 'SEO' (or other related topics and synonyms), then the method of the invention may cross reference account names that are similar to see if any of those had matches for the relevant semantic topics identified from the draft post.

For example, the following five tags were found to be close to the one the user had inserted in their draft post: "@Star Enterprises", but doesn't meet the predefined threshold of overlap for the identified semantic topics; "@Star_Enterprise Inc", but doesn't meet the predefined threshold of overlap for the identified semantic topics; "@Star_Enterprise UK", DOES meet the predefined threshold of overlap for the identified semantic topics; "@1Star_Enterprise", but doesn't meet the predefined threshold of overlap for these semantic topics; and "@Star_1_Enterprise", but doesn't meet the predefined threshold of overlap for these semantic topics.

As shown, only one of these accounts met the predefined threshold of overlap for the identified semantic topics (e.g., 'web', 'marketing', 'digital', or 'SEO'). Accordingly, the tag "@Star_Enterprise UK" may be suggested to the user as a replacement for the tag "@Star_Enterprise".

For the purposes of further illustration, a further worked example of the methods of the invention is provided below. In the example below, two users share the same name and have nearly identical user handles. One of the users is a comedian with the user handle "@the_name_handle" and the other user is a professional footballer with the user handle "@name_handle". Through their use of a social media platform (including post content, user biography, likes, etc.) the method identifies a list of semantic topics for both the comedian and the footballer. The semantic topics for the comedian are comedy, TV and film and the sematic topics for the footballer are goal, goalkeeping and football.

The first user, who is a football fan, composes the following draft post: "@the_name_handle was amazing in goal tonight. We're going to win the league!"

The social media platform may parse the post in real-time as it is being composed by the first user and identifies the semantic topics 'goal', 'win' and 'league'. These identified sematic topics are then compared with the semantic topics for @the_name_handle that were automatically extracted from their user account activity. It may then be determined that that there are no overlaps between the post context and the tag context. In other words, the correlation between the post contents and the tagged user account do not meet the predefined threshold of overlap for the identified semantic topics.

Other user accounts within a certain character distance of 'the_name_handle' may then be searched and a list of potential matches may be compiled. The semantic topics identified with the draft post may then be compared with the list of semantic topics for the potential user account matches. These results may be ranked in terms of overlap of semantic topics. In this example, the top match is 'name_handle' due to the matching of 'goal' as a sematic topic, and potentially other synonyms and related terms.

The first user may then be provided with a UI prompt suggesting that @the_name_handle might not be the account they intended to tag in the post and that @name_handle is more likely to be the user account they intended to tag. The user may then accept the prompt and the change is made to their draft post before it is then published.

In a more generalized example, the methods of the invention may perform the steps of parsing a draft post a first user is composing and identify semantic tags/labels, such as "football". Tagged user(s) in the draft post may be found and their semantic labels list identified, which may be either self-defined by that user or determined based the user's record on the social media platform as described above. The social media platform may build up a corpus of information about every user, including a list of semantic topics associated with each user. The overlap of the labels between draft tweet and labels for tagged user(s) are compared and, if the overlap is over a threshold value, the draft post is kept as is. Otherwise, it may be determined that the tagged user(s) may not be the user(s) intended by the first user.

It should now be understood by those of skill in the art, in embodiments of the present invention, the proposed tag checking methods provide numerous advantages over conventional user tagging approaches. These advantages include, but are not limited to, the reduction in the number of erroneous tags included in a post composed by a user. In embodiments of the present invention, this technical solution is accomplished by taking into account the context of the post, the context of the user writing the post and the context of the user being tagged in the post.

In still further advantages to a technical problem, the systems and processes described herein provide a computer-implemented method for efficient tag relevance checking, which may be provided on (or via) on a distributed communication network. In this case, a computer infrastructure, such as the computer system shown in FIGS. 1 and 4 or the cloud environment shown in FIG. 2 can be provided and one or more systems for performing the processes of the invention can be obtained (e.g., created, purchased, used, modified, etc.) and deployed to the computer infrastructure. To this extent, the deployment of a system can comprise one or more of:

(i) installing program code on a computing device, such as computer system shown in FIG. 1, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method comprising:

responsive to receiving, by one or more computer processors, a social media post composed by a first user and containing a tag referring to a second user, wherein the social media post includes text:

obtaining, by one or more computer processors, (i) a post context based on a topic extracted from the social media post, (ii) a user context based on a first user record of the first user, and (iii) a tag context based on a second user record of the second user;

comparing, by one or more computer processors, the post context and the user context to the tag context;

determining, by one or more computer processors, the tag is irrelevant to the post based on:

comparing the post context and the user context to the tag context; and determining that a threshold predefined percentage match of topics between (i) the post context and the user context and (ii) the tag context is not met;

searching, by one or more computer processors, for a relevant tag based on the post context and the user context; and posting, by one or more computer processors, the social media post to a social media platform with the relevant tag and without the tag.

2. The computer-implemented method of claim 1, further comprising determining, by one or more computer processors, the post context of the post based on the topic of the post.

3. The computer-implemented method of claim 2, wherein determining the post context of the post comprises:

extracting, by one or more computer processors, the topic from the post;

analyzing, by one or more computer processors, the topic extracted from the post; and determining, by one or more computer processors, the post context based on a result of analyzing the topic extracted from the post.

4. The computer-implemented method of claim 2, wherein:

the post comprises a plurality of topics; and determining the post context of the post comprises:

extracting, by one or more computer processors, the plurality of topics from the post;

analyzing, by one or more computer processors, each extracted topic of the plurality of topics; and determining, by one or more computer processors, one or more post contexts based on a result of analyzing each extracted topic of the plurality of topics.

5. The computer-implemented method of claim 4, further comprising:

for each determined post context, determining, by one or more computer processors, a proportion of the post relating to the determined post context; and ranking, by one or more computer processors, each determined post context based on the determined proportions of the post relating to each determined post context, wherein determining the tag is irrelevant to the post is further based on ranking the determined post contexts.

6. The computer-implemented method of claim 1, further comprising determining, by one or more computer processors, the user context of the first user based on the first user record of the first user.

7. The computer-implemented method of claim 6, wherein determining the user context of the first user comprises:

extracting, by one or more computer processors, a first user topic from the first user record of the first user;

analyzing, by one or more computer processors, the extracted first user topic; and determining, by one or more computer processors, the user context based on a result of analyzing the extracted first user topic.

8. The computer-implemented method of claim 6, wherein:

the first user record of the first user comprises a plurality of first user topics; and determining the user context of the first user comprises:

extracting, by one or more computer processors, the plurality of first user topics from the first user record of the first user;

analyzing, by one or more computer processors, each extracted first user topic of the plurality of first user topics; and determining, by one or more computer processors, one or more user contexts based on a result of analyzing each extracted first user topic.

9. The computer-implemented method of claim 1, further comprising determining, by one or more computer processors, the tag context of the tag based on the second user record of the second user.

10. The computer-implemented method of claim 9, wherein determining the tag context of the tag comprises:

extracting, by one or more computer processors, a user topic from the second user record of the second user;

analyzing, by one or more computer processors, the user topic extracted from the second user record; and determining, by one or more computer processors, the tag context based on a result of analyzing the user topic extracted from the second user record.

11. The computer-implemented method of claim 9, wherein:

the second user record of the second user comprises a plurality of second user topics; and determining the post context of the post comprises:

extracting, by one or more computer processors, the plurality of second user topics from the second user record of the second user;

analyzing, by one or more computer processors, each of the extracted second user topics; and determining, by one or more computer processors, one or more tag contexts based on a result of analyzing the extracted second user topics.

12. The computer-implemented method as claimed in claim 1, wherein determining the tag is irrelevant to the post comprises:

determining, by one or more computer processors, an overlap between the tag context and the post context and the user context based on comparing the post context and the user context to the tag context, wherein the overlap is the threshold predefined percentage match of topics; and determining, by one or more computer processors, a relevance of the tag to the post based on determining the overlap between the tag context and the post context and the user context.

13. The computer-implemented method as claimed in claim 1, wherein:

the post comprises a plurality of topics;

the second user record of the second user comprises a plurality of user topics;

one or more post contexts are determined based on the plurality of topics;

one or more tag contexts are determined based on the plurality of user topics; and determining the tag is irrelevant to the post comprises:

determining, by one or more computer processors, an overlap between the one or more tag contexts and the one or more post contexts and the one or more user contexts based on comparing the post context and the user context to the tag context, wherein the overlap is the threshold predefined percentage match of topics; and determining, by one or more computer processors, the relevance of the tag to the post based on determining the overlap.

14. The computer-implemented method of claim 1, wherein determining the tag is irrelevant to the post comprises:

identifying, by one or more computer processors, an ignored topic of the first user, wherein the ignored topic is a topic that the first user has specified as not relevant;

comparing, by one or more computer processors, the ignored topic to the tag context; and determining, by one or more computer processors, the relevance of the tag to the post based on comparing the ignored topic to the tag context.

15. The computer-implemented method of claim 1, further comprising generating, by one or more computer processors, an alert to be provided to the first user.

16. The computer-implemented method of claim 1, wherein:

the record of the first user comprises a selection from the group consisting of:

a first user biography of the first user;

a first previous post by the first user;

a first interaction with a first post composed by a third user, wherein the third user does not include the first user or the second user;

a first interaction with the third user;

a first selected topic of interest;

a first number of posts made by the first user;

a first activity of the first user; and a first amount of time elapsed since a most recent activity of the first user; and the record of the second user comprises a selection from the group consisting of:

a second user biography of the second user;

a second previous post by the second user;

a second interaction with a second post composed by a fourth user, wherein the fourth user does not include the first user or the second user;

a second interaction with the fourth user;

a second selected topic of interest;

a second number of posts made by the second user;

a second activity of the second user; and a second amount of time elapsed since a most recent activity of the second user.

17. The computer-implemented method of claim 1, wherein searching for the relevant tag based on the post context and the user context comprises:

referencing, by one or more computer processors, a list of other user accounts that are within a specified number of characters different from characters of the tag; and comparing, by one or more computer processors, the post context and the user context to each user account of the list.

18. The computer-implemented method of claim 1, further comprising:

generating, by one or more computer processors, a user interface prompt recommending that the first user replace the tag with the relevant tag.

19. A computer program product comprising:

one or more computer readable storage media, and program instructions collectively stored on the one or more computer readable storage media, the program instructions comprising:

program instructions to, responsive to receiving a social media post composed by a first user and containing a tag referring to a second user, wherein the social media post includes text:

obtain (i) a post context based on a topic extracted from the social media post, (ii) a user context based on a record of the first user, and (iii) a tag context based on a record of the second user;

compare the post context and the user context to the tag context;

determine the tag is irrelevant to the post based on:

comparing the post context and the user context to the tag context; and determining that a threshold predefined percentage match of topics between (i) the post context and the user context and (ii) the tag context is not met;

search for a relevant tag based on the post context and the user context; and post the social media post to a social media platform with the relevant tag and without the tag.

20. A computer system comprising:

one or more computer processors, one or more computer readable storage media, and program instructions collectively stored on the one or more computer readable storage media for execution by at least one of the one or more computer processors, the program instructions comprising:

program instructions to, responsive to receiving a social media post composed by a first user and containing a tag referring to a second user, wherein the social media post includes text:

obtain (i) a post context based on a topic extracted from the social media post, (ii) a user context based on a record of the first user, and (iii) a tag context based on a record of the second user;

compare the post context and the user context to the tag context;

determine the tag is irrelevant to the post based on:

comparing the post context and the user context to the tag context; and determining that a threshold predefined percentage match of topics between (i) the post context and the user context and (ii) the tag context is not met;

search for a relevant tag based on the post context and the user context; and post the social media post to a social media platform with the relevant tag and without the tag.

* * * * *